United States Patent
Shibata et al.

(10) Patent No.: US 9,253,363 B2
(45) Date of Patent: Feb. 2, 2016

(54) LIGHT SOURCE UNIT OF IMAGE-READING APPARATUS AND IMAGE-READING APPARATUS WITH LIGHT SOURCE UNIT

(71) Applicant: PFU Limited, Ishikawa (JP)

(72) Inventors: Hideaki Shibata, Ishikawa (JP); Keisuke Kokuma, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/243,595

(22) Filed: Apr. 2, 2014

(65) Prior Publication Data
US 2015/0085329 A1 Mar. 26, 2015

(30) Foreign Application Priority Data
Sep. 26, 2013 (JP) ................................ 2013-199930

(51) Int. Cl.
*H04N 1/04* (2006.01)
*H04N 1/32* (2006.01)

(52) U.S. Cl.
CPC ................................ *H04N 1/32646* (2013.01)

(58) Field of Classification Search
CPC ................................................ H04N 1/32646
USPC ......... 358/475, 484, 496, 408, 474, 482, 483, 358/509, 505, 514; 250/208.1, 227.11, 250/234–236, 239, 216; 362/800, 600, 606, 362/608, 612, 615; 399/220, 221; 355/67, 355/68, 70, 71
See application file for complete search history.

(56) References Cited

U.S. PATENT DOCUMENTS

| | | | | |
|---|---|---|---|---|
| 7,538,911 B2* | 5/2009 | Sakurai et al. | ................. | 358/475 |
| 7,995,252 B2* | 8/2011 | Okamoto et al. | ............. | 358/487 |
| 8,056,807 B2* | 11/2011 | Lo et al. | ......................... | 235/454 |
| 8,681,398 B2* | 3/2014 | Shimoda et al. | ............. | 358/475 |
| 2007/0147073 A1* | 6/2007 | Sakai et al. | .................... | 362/607 |
| 2009/0284967 A1 | 11/2009 | Maruyama | | |
| 2010/0079980 A1* | 4/2010 | Sakai | ........................... | 362/97.1 |
| 2010/0195322 A1* | 8/2010 | Kawakami et al. | ........... | 362/231 |
| 2014/0014819 A1* | 1/2014 | Yoshida | ..................... | 250/208.1 |

FOREIGN PATENT DOCUMENTS

| | | | |
|---|---|---|---|
| JP | 2009-277551 A | 11/2009 | |
| JP | 2011-151477 A | 8/2011 | |

* cited by examiner

*Primary Examiner* — Cheukfan Lee
(74) *Attorney, Agent, or Firm* — McDermott Will & Emery LLP

(57) ABSTRACT

An image-reading apparatus includes a light source unit that includes, a light source section on which a plurality of light-emitting elements that emit light toward a medium whose image is read by an image-capturing unit are arranged in a main-scanning direction, and a diffusion unit that diffuses therein the light emitted from the light-emitting elements, wherein a rib provided in a frame of the image-reading apparatus, the rib being capable of being fitted with a cutout portion, the light source section includes a connector provided at one end of the main-scanning direction and the cutout portion provided at the other end of the main-scanning direction, the diffusion unit has a shape through which the light source section is inserted, and a size of the diffusion unit in the main-scanning direction is equal to or shorter than a distance between the connector and the cutout portion.

5 Claims, 8 Drawing Sheets

POSITION IN MAIN SCANNING DIRECTION
[mm]

POSITION IN MAIN SCANNING DIRECTION
[mm]

LIGHT SOURCE UNIT OF IMAGE-READING APPARATUS AND IMAGE-READING APPARATUS WITH LIGHT SOURCE UNIT

CROSS-REFERENCE TO RELATED APPLICATIONS

This application is based upon and claims the benefit of priority from Japanese Patent Application No. 2013-199930, filed Sep. 26, 2013, the entire contents of which are incorporated herein by reference.

BACKGROUND OF THE INVENTION

1. Field of the Invention

The present invention relates to a light source unit of an image-reading apparatus and an image-reading apparatus with the light source unit.

2. Description of the Related Art

Conventionally, as a light source of an image-reading apparatus, a configuration in which a plurality of light-emitting elements, such as light-emitting diodes (LEDs), are arranged in a straight line along a main-scanning direction has been known (for example, refer to Japanese Laid-open Patent Publication No. 2009-277551).

When performing reduction of sizes of an image-reading apparatus to which the above-described light source is applied, since a mounting space for the light source is very small, light emitted onto a medium to be lighted cannot be fully diffused, which could lead to generation of a ripple or illuminance unevenness. When the medium is read with the image-reading apparatus in such a condition, an image ripple of a striped pattern depending on a pitch between the light-emitting elements will also be generated in the generated read image of the medium.

The present invention has been made in view of the aforementioned problems, and an object of the present invention is to provide a light source unit of an image-reading apparatus and an image-reading apparatus with the light source unit having a configuration in which a plurality of light-emitting elements are arranged in a straight line to suppress generation of a ripple in light emitted linearly onto the medium to be lighted.

SUMMARY OF THE INVENTION

It is an object of the present invention to at least partially solve the problems in the conventional technology. According to an aspect of the present invention, a light source unit of an image-reading apparatus includes a light source section on which a plurality of light-emitting elements that emit light toward a medium whose image is read by an image-capturing unit are arranged in a main-scanning direction, and a diffusion unit that transmits and diffuses therein the light emitted from the light-emitting elements. A pattern for suppressing emission of light to an outside is formed at a position opposite each of the plurality of light-emitting elements in the diffusion unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a light source unit of an image-reading apparatus and an image-reading apparatus with the light source unit according to the present invention will be described below with reference to the drawings. In the following drawings, identical or equivalent parts are provided with identical reference numbers, and the description thereof is not repeated.

Embodiment

Figure 1:
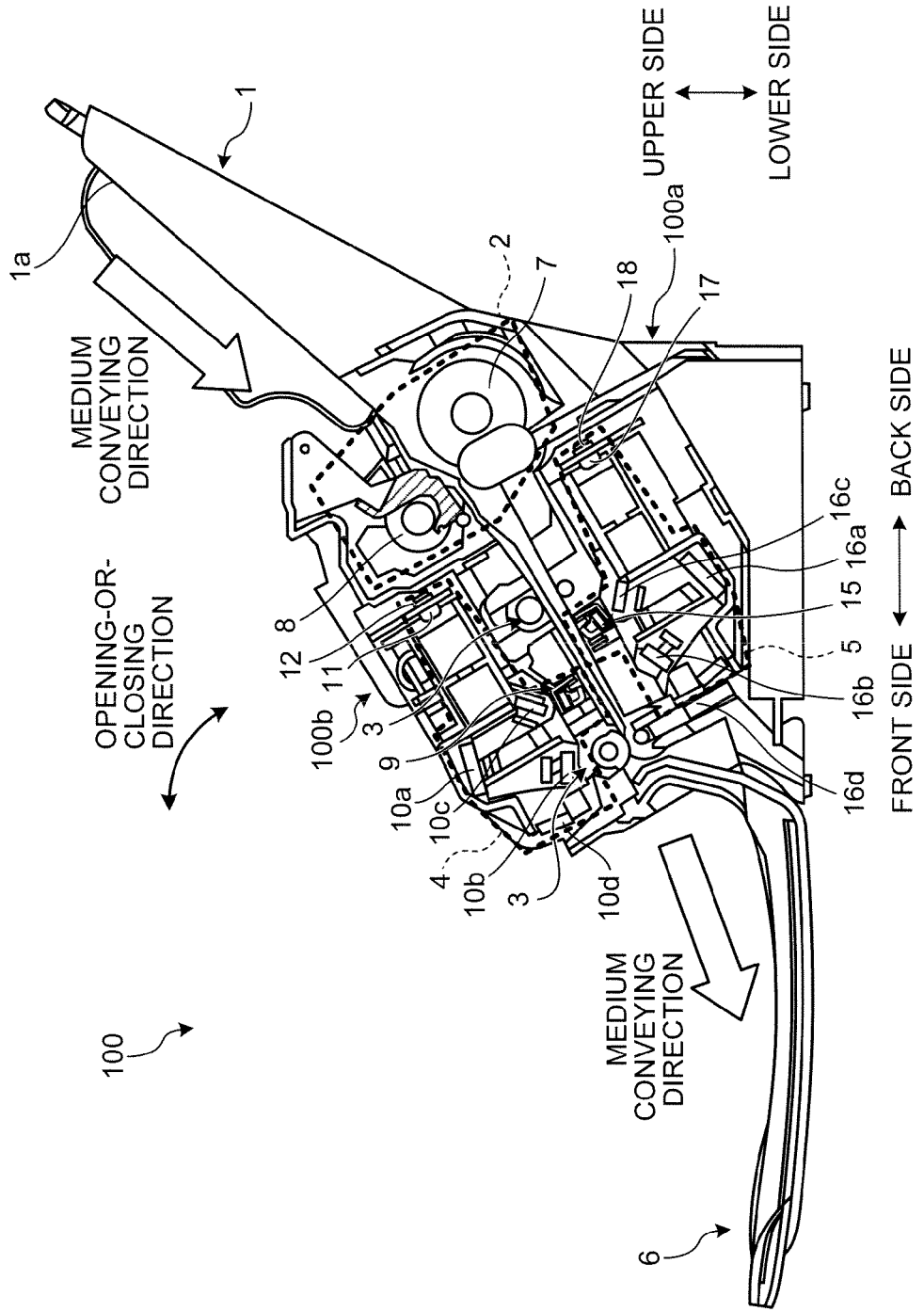
FIG. 1 is a vertical sectional view illustrating a schematic configuration of an image-reading apparatus to which a light source unit according to an embodiment of the present invention is applied.
Figure 2:
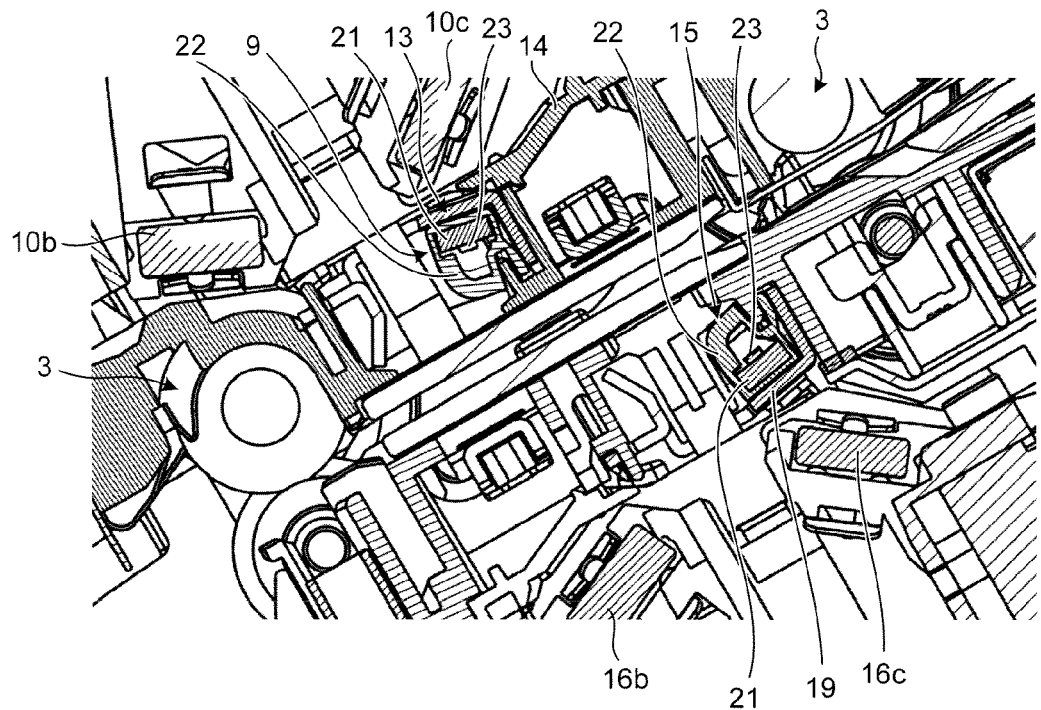
FIG. 2 is an enlarged view of a vicinity of the light source unit in FIG. 1.
Figure 3:
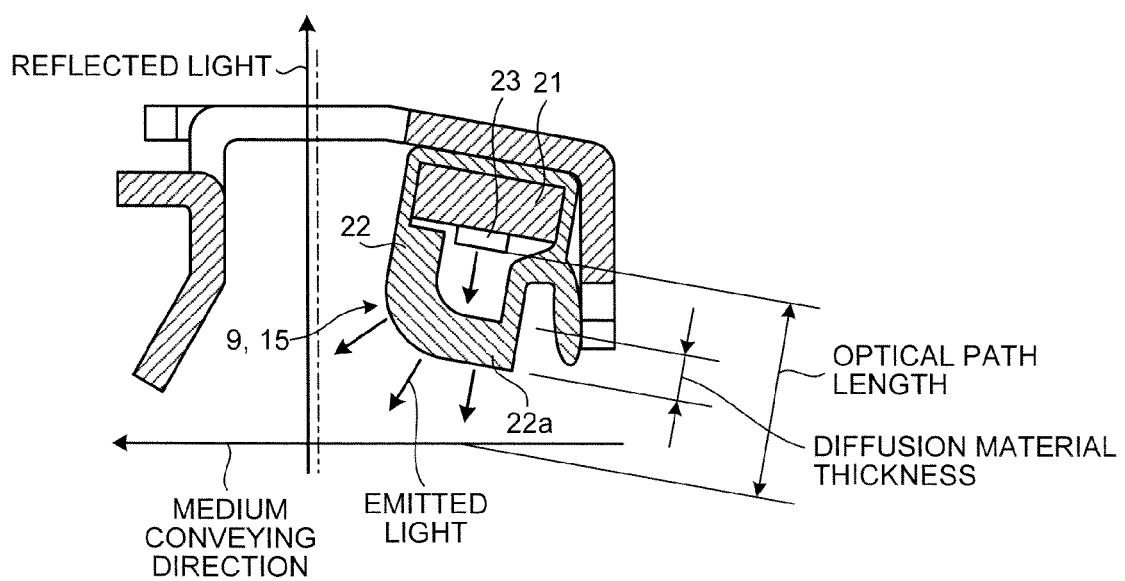
FIG. 3 is a schematic view of the light source unit in FIGS. 1 and 2.

First, a configuration of an image-reading apparatus 100 to which light source units 9 and 15 according to the present embodiment are applied will be described with reference to FIGS. 1 to 3. FIG. 1 is a longitudinal sectional view illustrating a schematic configuration of the image-reading apparatus to which the light source unit according to the embodiment of the present invention is applied, FIG. 2 is an enlarged view of a vicinity of the light source unit in FIG. 1, and FIG. 3 is a schematic view of the light source unit in FIGS. 1 and 2. In the following description, a leftward direction of FIG. 1 is represented as "front side", and a rightward direction is represented as "back side" of the image-reading apparatus 100. An upward direction of FIG. 1 is represented as an upper side, and a downward direction is represented as a lower side of the image-reading apparatus 100.

The image-reading apparatus 100 is an apparatus configured to read a medium to be read and generate image data of the medium. The present embodiment will be described by exemplifying a scanner device. The medium includes, for example, a reading object in the form of a sheet, such as a manuscript and a business card, and a recording medium in the form of a sheet, such as a printing paper and a flat paper. As illustrated in FIG. 1, the image-reading apparatus 100 includes a shooter 1, a medium feeding unit 2, a conveying roller 3, a first image-reading unit 4, a second image-reading unit 5, and a stacker 6.

The shooter 1 is provided on the back side of the image-reading apparatus 100. The shooter 1 is a mounting stand and a plurality of media are mounted in a pile on a mounting surface 1a. The medium feeding unit 2 sends out the medium mounted in the shooter 1 one by one in a medium conveying direction from the back side to the front side. The conveying roller 3 conveys the medium sent out from the medium feeding unit 2 in the medium conveying direction. The first image-reading unit 4 reads an image of a front surface (upper side surface) of the medium and generates image data of the front surface of the medium. The second image-reading unit 5 reads an image of a back surface (lower side surface) of the medium and generates image data of the back surface of the medium. The stacker 6 is provided in the front side of the image-reading apparatus 100. The medium with the image read by the image-reading units 4 and 5 is discharged to the front side of the image-reading apparatus 100 by the conveying roller 3, and is mounted on the stacker 6. That is, the image-reading apparatus 100 is an automatic paper-feeding scanner configured to shift the medium relative to the first image-reading unit 4 and the second image-reading unit 5 by shifting the medium to be read in the medium conveying direction.

The medium feeding unit 2 includes a pick roller 7 and a brake roller 8. The pick roller 7 is a delivery unit configured to send out the medium mounted in the shooter 1 in the medium conveying direction. The brake roller 8 is disposed to be pressed against the pick roller 7. The brake roller 8 is a separation unit configured to separate a plurality of overlapping media to prevent double feeding when the plurality of media are sent out overlapping by the pick roller 7.

The image-reading apparatus 100 includes a body unit 100a, which is to be installed on an installation plane such as on a surface of a desk, and a rotating unit 100b disposed on the upper side of the body unit 100a. The rotating unit 100b is rotatably supported relative to the body unit 100a and capable of rotating in an opening-or-closing direction as illustrated in FIG. 1. The opening-or-closing direction of the rotating unit 100b is a rotating direction orthogonal to the medium conveying direction, and a direction centered on a rotational axis parallel to the installation plane on which the image-reading apparatus 100 is installed. The rotational axis of the rotating unit 100b is disposed parallel to rotation axes of the pick roller 7 and the brake roller 8 of the medium feeding unit 2, and a rotation axis of the conveying roller 3. As illustrated in FIG. 1, the pick roller 7 of the medium feeding unit 2 and the second image-reading unit 5 are provided in the body unit 100a. The brake roller 8 of the medium feeding unit 2 and the first image-reading unit 4 are provided in the rotating unit 100b. That is, in the image-reading apparatus 100, a conveying route for conveying the medium in the medium conveying direction from the shooter 1 on the back side to the stacker 6 on the front side is provided so that the conveying route passes between the body unit 100a and the rotating unit 100b, that is, between the pick roller 7 and the brake roller 8 of the medium feeding unit 2, and further passes between the first image-reading unit 4 and the second image-reading unit 5.

The first image-reading unit 4 and the second image-reading unit 5 are provided at opposite sides with each other with respect to the conveying route of the medium so as to be opposed to each other. The first image-reading unit 4 is provided on the upper side of the medium conveying route and reads an image of the front surface (upper side surface) of the medium conveyed in the medium conveying direction along the conveying route, as described above. The second image-reading unit 5 is provided on the lower side of the medium conveying route and reads an image of the back surface (lower side surface) of the medium conveyed in the medium conveying direction along the conveying route. The first image-reading unit 4 and the second image-reading unit 5 read an image of the front surface and the back surface of the medium conveyed in the medium conveying direction along the conveying route, in which a direction orthogonal to the medium conveying direction and parallel to the installation plane on which the image-reading apparatus 100 is installed is defined as a main-scanning direction, and the medium conveying direction is defined as a sub-scanning direction.

The first image-reading unit 4 includes the light source unit 9, mirrors 10a, 10b, 10c, and 10d, a lens 11, and an image sensor 12 (image capturing unit) as illustrated in FIG. 1. The light source unit 9 is disposed so as to directly emit light toward the conveying route from the upper side along the main-scanning direction, and when the medium exists in the conveying route, the light source unit 9 directly emits light toward the front surface of the medium along the main-scanning direction. The light emitted from the light source unit 9 onto the front surface of the medium is introduced into, or incident on, the lens 11 via the mirror 10a, the mirror 10b, the mirror 10c, and the mirror 10d after being reflected on the front surface of the medium. The lens 11 causes an image of the medium front surface to be focused on the image sensor 12 by the light passing therethrough which is emitted from the light source unit 9 and reflected on the medium front surface. The image sensor 12 is a line sensor with a plurality of sensor elements disposed in a straight line in the main-scanning direction. The image sensor 12 generates a line image of the medium front surface along the main-scanning direction depending on incident light through the lens 11. Then, the line images of the whole medium front surface are generated by shifting the medium in the medium conveying direction (sub-scanning direction). The image data of the medium front surface is generated by synthesizing the line images.

The second image-reading unit 5 includes the light source unit 15, mirrors 16a, 16b, 16c, and 16d, a lens 17, and an image sensor 18 (image capturing unit) as illustrated in FIG. 1. The light source unit 15 is disposed so as to directly emit light toward the conveying route from the lower side along the main-scanning direction, and when the medium exists in the conveying route, the light source unit 15 directly emits light toward the back surface of the medium along the main-scanning direction. The light emitted from the light source unit 15 onto the back surface of the medium is introduced into, or incident on, the lens 17 via the mirror 16a, the mirror 16b, the mirror 16c, and the mirror 16d after being reflected on the back surface of the medium. The lens 17 causes an image of the medium back surface to be focused on the image sensor 18 by the light passing therethrough which is emitted from the light source unit 15 and reflected on the medium back surface. The image sensor 18 is a line sensor with a plurality of sensor elements disposed in a straight line in the main-scanning direction. The image sensor 18 generates a line image of the medium back surface along the main-scanning direction depending on incident light through the lens 17. Then, the line images of the whole medium back surface are generated by shifting the medium in the medium conveying direction (sub-scanning direction). The image data of the medium back surface is generated by synthesizing the line images.

The light source unit 9 of the first image-reading unit 4 and the light source unit 15 of the second image-reading unit 5 each include similar components, and as illustrated in FIGS. 2 and 3, each include an LED array substrate 21 (light source section) and an LED diffusion case 22. A plurality of LEDs 23 as light-emitting elements configured to emit light toward the medium are arranged in the main-scanning direction in a straight line on the LED array substrate 21 (refer to FIG. 5). The light source units 9 and 15 are LED array lighting configured so that the plurality of LEDs 23 emit light toward the medium linearly in the main-scanning direction.

Figure 4:
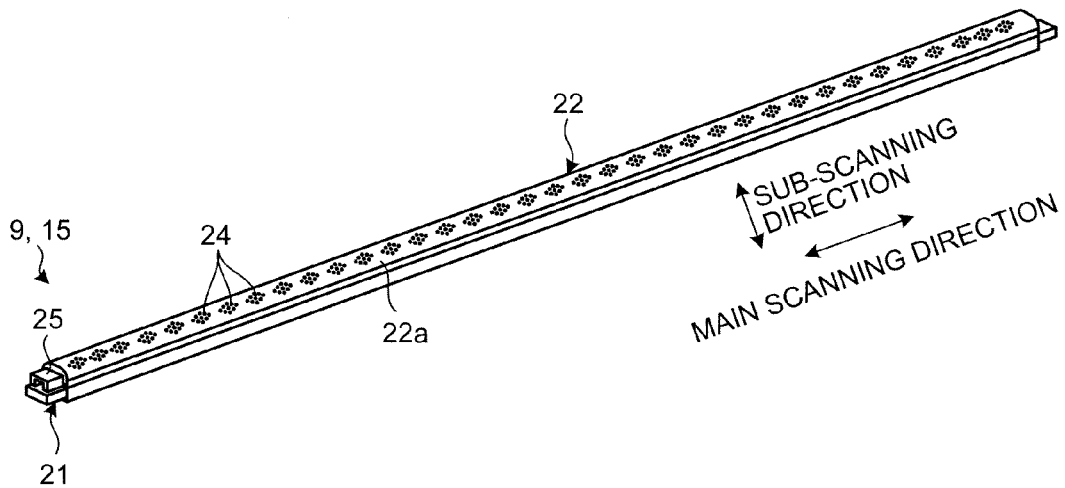
FIG. 4 is a perspective view of the light source unit according to the embodiment of the present invention.

The LED diffusion case 22 is disposed so as to cover a periphery of the LED array substrate 21 along the longitudinal direction (refer to FIG. 4). As illustrated in FIG. 3, the LED diffusion case 22 has a diffusion unit 22a for transmitting the light emitted from the LED 23 and diffusing the light therein over a region in which the light is to be emitted onto the medium, between the LED 23 and the conveying route of the medium on the optical axis of the LED 23. The diffusion unit 22a can emit the light emitted from the LED 23 toward the optical axis onto the medium, after widening an emission region to a predetermined range in the main-scanning direction. Similarly, the diffusion unit 22a may widen an emission region to a predetermined range in the sub-scanning direction and then emit the light emitted from the LED 23 toward the optical axis onto the medium. In this way, the diffusion unit 22a can disperse the light emitted from the LED 23 toward the optical axis uniformly in a wide range, and emit the light onto the medium. Different from other portions of the LED diffusion case 22, the diffusion unit 22a has a thickness for diffusion to realize a predetermined optical diffusion.

As illustrated in FIG. 3, the light emitted from the LED 23 is emitted onto the medium after diffused to a predetermined emission range by the diffusion unit 22a. Then, the light reflected by the medium is guided to the mirror 10a in a case of the first image-reading unit 4, guided to the mirror 16a in a case of the second image-reading unit 5, and, as described above, used for an image reading process of the front surface and the back surface of the medium.

In order to decrease the size of the apparatus or the image-reading unit, as illustrated in FIG. 3, the image-reading apparatus 100 according to the present embodiment is configured to emit the light emitted from the light source units 9 and 15 directly toward the medium, that is, directly emit the light from the light source units 9 and 15 onto the medium. Similarly, a possible configuration for size reduction is a configuration to emit light reflected via reflection means (reflected light), such as a mirror, onto the medium after emitted from a light source. The configuration according to the present embodiment to emit light directly onto the medium, which does not reflect the light emitted onto the medium (hereinafter denoted as "emitted light"), can decrease loss of a light quantity of the emitted light, and can utilize the light quantity of the emitted light more efficiently as compared with the configuration to emit reflected light onto the medium. In addition, a shorter optical path length allows design of a compact unit and reduction of the size of the image-reading apparatus 100 and the image-reading unit more optimally.

In order to suppress the generation of a ripple or illuminance unevenness of the emitted light, the present embodiment is configured so that, on the optical axis of each LED 23 of the LED array substrate 21 as described above, the diffusion unit 22a is disposed between the LED 23 and the medium conveying route, and the light emitted from each LED 23 is emitted onto the medium after the emission region is extended. However, since the optical path length between each LED 23 of the light source units 9 and 15 and the medium is configured to be short because of the reduced size of the image-reading apparatus 100, diffusion of the emitted light may be insufficient only by the function of the diffusion unit 22a, illuminance of the emitted light may be uneven, and the ripple may not be completely suppressed. Therefore, in the present embodiment, in order to suppress the ripple more optimally, a pattern 24 is formed for suppressing emission of the light from the diffusion unit 22a to the outside, and suppressing ripple generation at positions opposite each of the plurality of LEDs 23 of the LED array substrate 21 on the diffusion unit 22a of the light source units 9 and 15.

Figure 5:
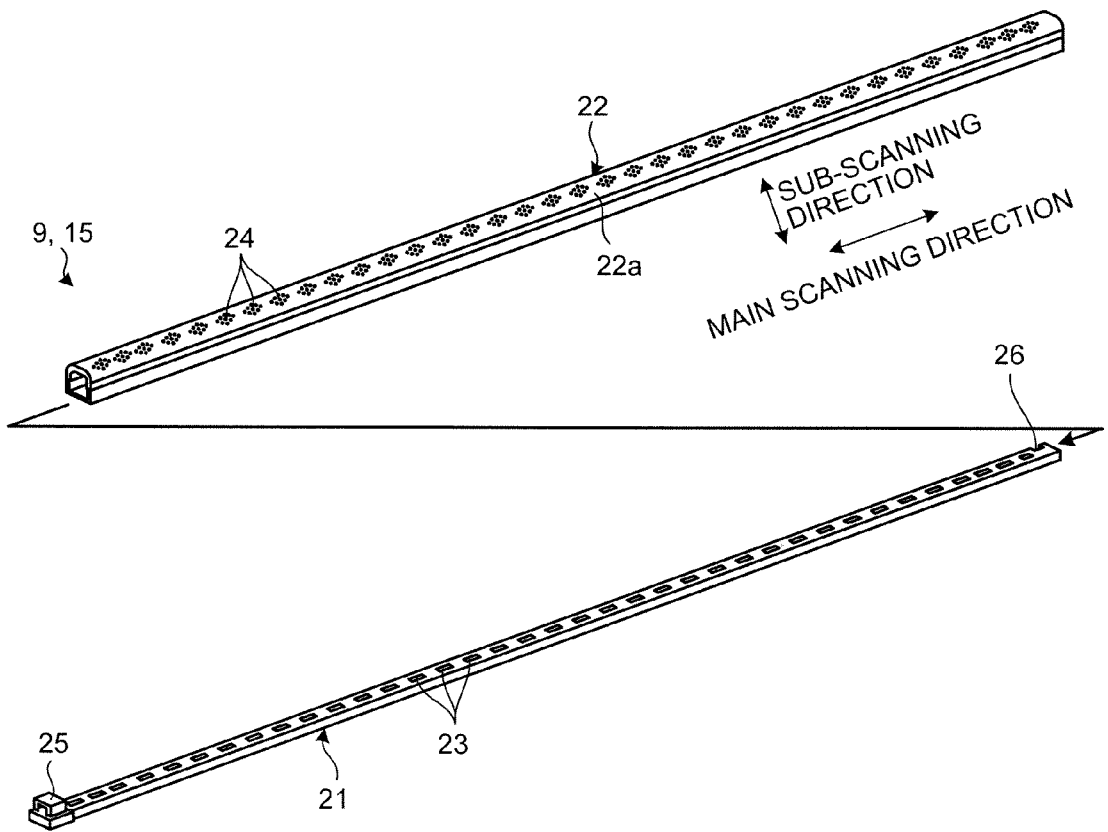
FIG. 5 is a perspective view of an LED array substrate and an LED diffusion case which are components of the light source unit illustrated in FIG. 4.
Figure 6:
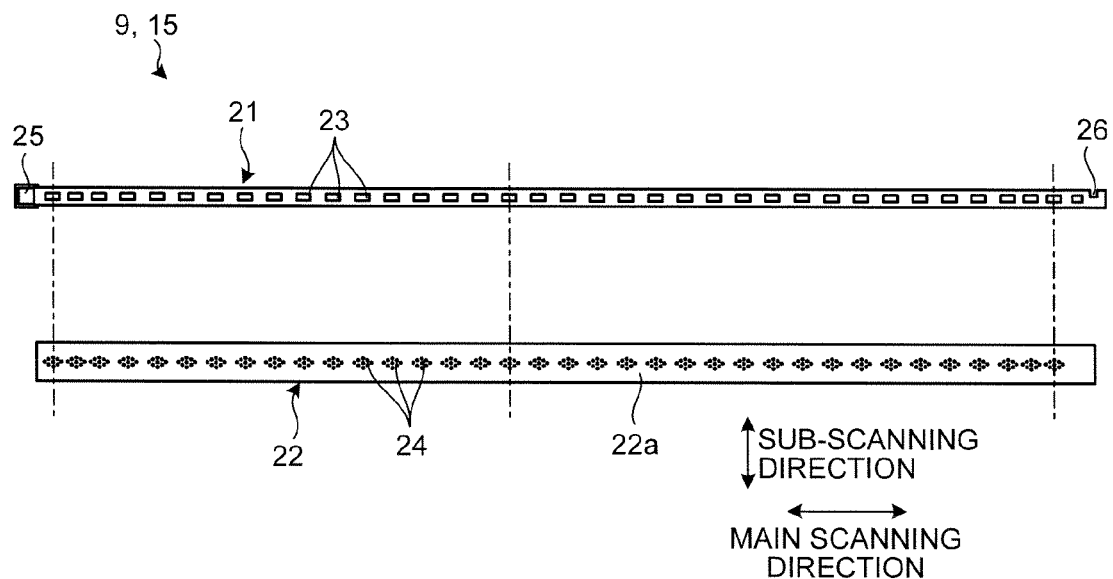
FIG. 6 is a diagram illustrating a relationship between an arrangement of each LED on the LED array substrate and an arrangement of a pattern on the LED diffusion case of FIG. 5.
Figure 7:
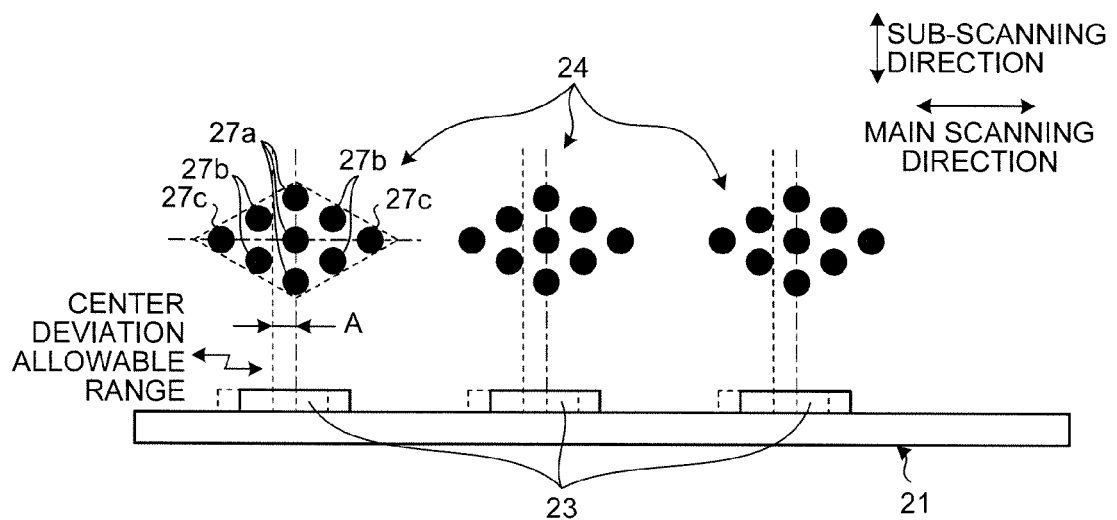
FIG. 7 is a schematic view for illustrating an allowable range of a deviation of a central position (deviation of a center) of the pattern relative to an optical axis of the LED.

The description of the configuration of the light source units 9 and 15 of the present embodiment will focus on the pattern 24 in further detail with reference to FIGS. 4 to 7. FIG. 4 is a perspective view of the light source unit according to the embodiment of the present invention. FIG. 5 is a perspective view of the LED array substrate and the LED diffusion case which are components of the light source unit illustrated in FIG. 4. FIG. 6 is a diagram illustrating a relationship between an arrangement of each LED on the LED array substrate of FIG. 5, and an arrangement of the pattern on the LED diffusion case. FIG. 7 is a schematic view for illustrating an allowable range of a deviation of a central position (deviation of a center) of the pattern relative to the optical axis of the LED.

As illustrated in FIGS. 4 and 5, the LED diffusion case 22 is a tubular member, and the LED array substrate 21 can be accommodated therein from an opening of an end face of the LED diffusion case 22. In the diffusion unit 22a of the LED diffusion case 22, on the outer surface which is a surface on the side to face the medium, the pattern 24 is printed at a position through which the optical axis of each LED 23 passes when the LED array substrate 21 is accommodated.

As illustrated in FIG. 6, the pattern 24 is printed so as to coincide with an arrangement pitch of the LED 23. In other words, the pattern 24 is disposed so that the central position of the pattern shape coincides with the position through which the optical axis of each LED 23 passes in a condition in which the LED array substrate 21 is accommodated in the LED diffusion case 22, as illustrated in FIG. 7. That is, the pattern 24 is configured so as to suppress illuminance unevenness of the emitted light by partially suppressing emission of the light emitted from the diffusion unit 22a onto the medium in a vicinity of the optical axis of each LED 23 where the illuminance of the emitted light is higher.

In addition, the pattern 24 is formed so that the degree of suppression of the quantity of emitted light from the diffusion unit 22a to the outside decreases with distance from the central position of the pattern shape, that is, the position through which the optical axis of the LED 23 passes in the main-scanning direction. Similarly, the pattern 24 is formed so that the degree of suppression of the quantity of emitted light from the diffusion unit 22a to the outside decreases with distance from the central position of the pattern shape, that is, the position through which the optical axis of the LED 23 passes in the sub-scanning direction. "Decrease of the degree of suppression" mentioned above means increase of transmittance of light from the diffusion unit 22a to the outside by, for example, changing properties of the pattern, such as color, density, shape, arrangement, and area occupancy rate. That is, the pattern 24 is configured so that attenuation of the quantity of the emitted light from the diffusion unit 22a to the outside can be smoothly increased and the quantity of emission can be attenuated most significantly in the central position of the pattern shape in each of the main-scanning direction and the sub-scanning direction, as approaching the central position of the pattern shape.

In order to satisfy the above-described pattern-forming conditions, in the present embodiment, the pattern 24 is formed by halftone dot-printing so that halftone dots are disposed in a rhombus shape. More particularly, as illustrated in FIG. 7, the pattern 24 is a dot pattern which includes diagonal lines along the main scanning direction and the sub-scanning direction and a plurality of halftone dots or dots (points) disposed at meshes inside the rhombus whose intersectional point of the diagonal lines is a position through which the optical axis of the LED 23 passes. Each of the halftone dots which form the pattern 24 is all circular with an identical area. In the pattern 24 of the present embodiment, as illustrated in FIG. 7, three dots 27a, which is the maximum number, are disposed on the diagonal line, which the optical axis of the LED 23 passes, along the sub-scanning direction, two dots 27b are disposed at positions spaced from the diagonal line by a predetermined distance on both sides in the main-scanning direction, and one dot 27c is disposed at a position further spaced by the predetermined distance. That is, in the present embodiment, the degree of suppressing emission of the light from the diffusion unit 22a to the outside thereof in the main-scanning direction is decreased smoothly by reducing the number of the dots one by one along the main-scanning direction from the position through which the optical axis of the LED 23 passes. Similarly, the degree of suppressing emission of the light from the diffusion unit 22a to the outside thereof in the sub-scanning direction is decreased smoothly by reducing the number of the dots one by one along the sub-scanning direction from the position through which the optical axis of the LED 23 passes.

In the present embodiment, formation of such a rhombus-shaped pattern 24 allows partial suppression of emission of the light emitted from the diffusion unit 22a onto the medium in the vicinity of the optical axis of each LED 23 where the illuminance of the emitted light is larger. In addition, attenuation of the emission quantity of the light from the diffusion unit 22a to the outside thereof can be increased smoothly as approaching the central position of the pattern shape in each of the main-scanning direction and the sub-scanning direction, and the emission quantity can be most significantly attenuated in the central position. Therefore, illuminance unevenness of the emitted light can be further suppressed and generation of the ripple can be further suppressed.

Furthermore, in the main-scanning direction, the deviation of the central position (hereinafter also denoted as "deviation of a center") of the pattern shape relative to the position of the optical axis of the LED 23 is allowed in a predetermined allowable range A illustrated in FIG. 7 by forming the pattern 24 in such a halftone dot-printing rhombus shape. That is, even if the central position of the pattern shape of the pattern 24 deviates from the optical-axis position of the LED 23 within the allowable range A in the main-scanning direction, the ripple suppression effect similar to that in a case where the central position of the pattern shape coincides with the optical-axis position of the LED 23 can be provided. The allowable range A mentioned above refers to a distance from a central position of the dot 27a to a position of the side closest to the dot 27a out of the periphery of the dot 27b as illustrated in FIG. 7. Similarly, the deviation of the center in the sub-scanning direction is also allowed within the predetermined allowable range based on the dot distance of the pattern 24. This may sufficiently allow variations at the time of manufacturing and assembly of the LED array substrate 21 and the LED diffusion case 22.

The area occupancy rate of the halftone dots in the shape of the pattern 24 (also referred to as "halftone dot density" or "halftone dot rate") is optimally approximately 50 to 60%, for example. The rhombus shape of the pattern 24 is optimally configured so that the diagonal line of the main-scanning direction is a major axis and the diagonal line of the sub-scanning direction is a minor axis, which makes the attenuation range of the light in the main-scanning direction relatively wider to allow optimal suppression of ripple generation in the main-scanning direction.

Figure 8:
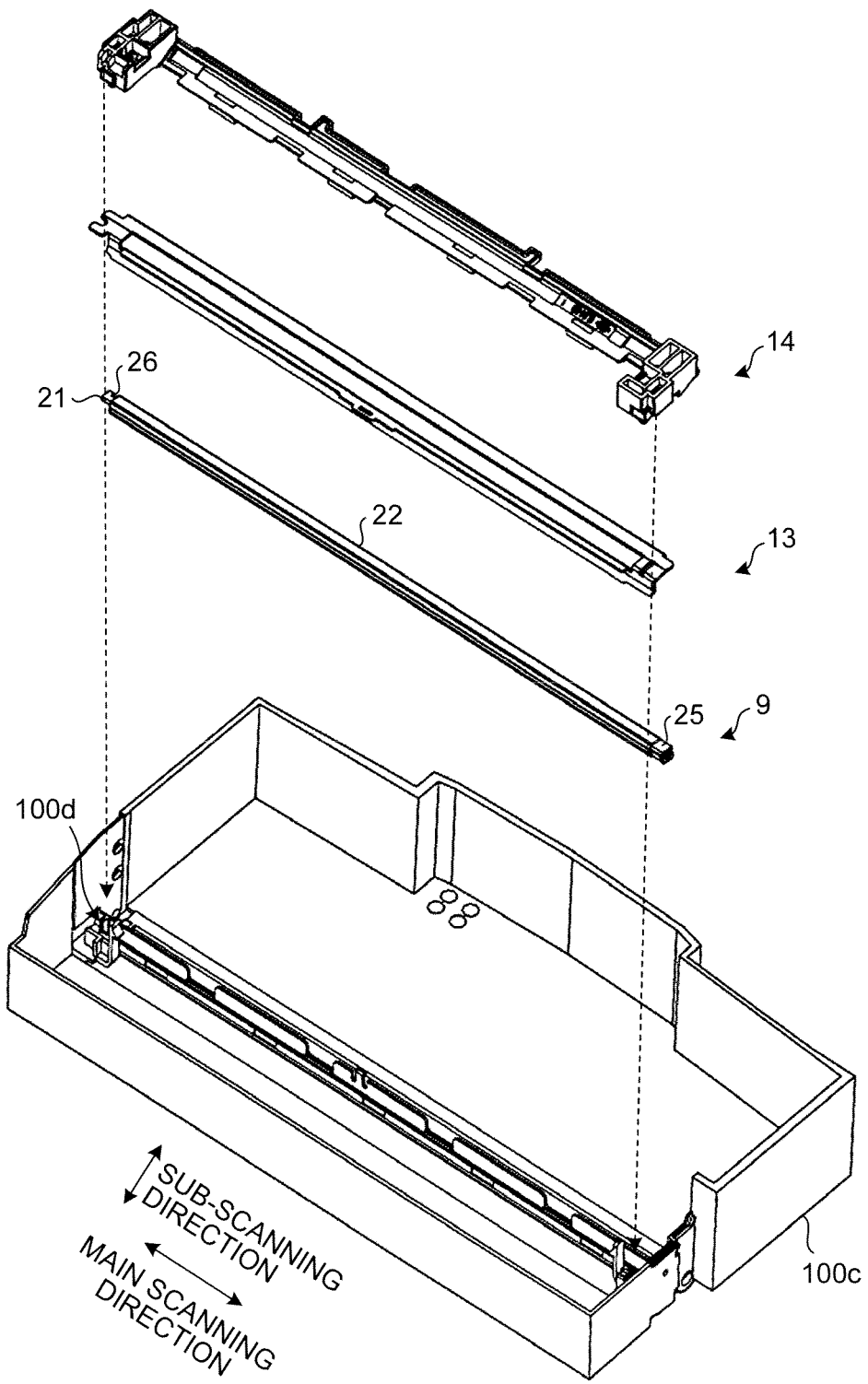
FIG. 8 is an exploded perspective view for illustrating assembly of the light source unit to the image-reading apparatus.
Figure 9:
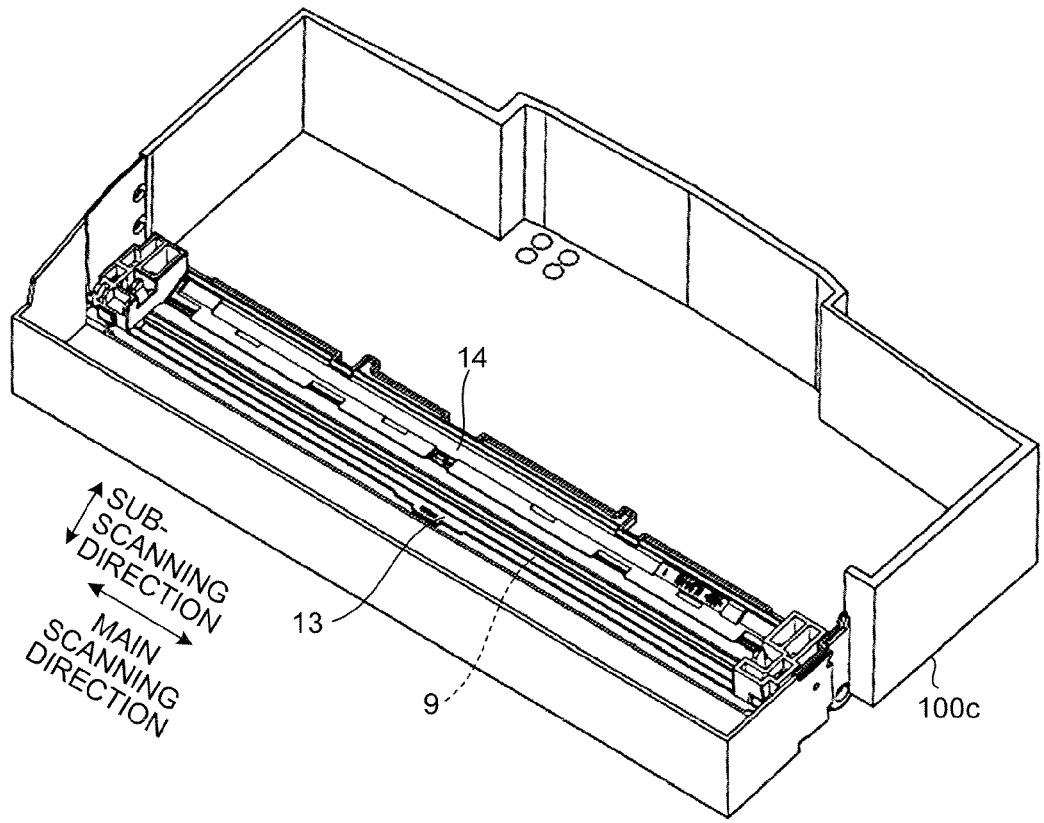
FIG. 9 is a perspective view illustrating a state in which each component illustrated in FIG. 8 is assembled to a frame.
Figure 10:
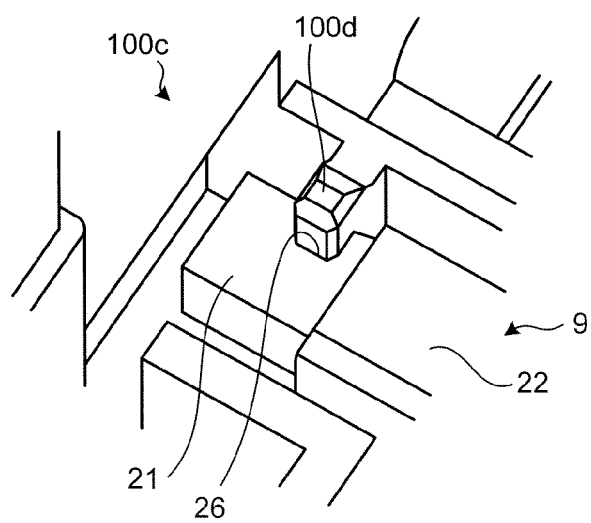
FIG. 10 is a perspective view illustrating a fitting portion between a cutout portion of the light source unit and a rib of the frame in a state where the light source unit is assembled to the frame.

Next, with reference to FIGS. 5 and 6 and FIGS. 8 to 10, and making the light source unit 9 of the first image-reading unit 4 as an example, assembly of the light source units 9 and 15 to the image-reading apparatus 100 will be described. FIG. 8 is an exploded perspective view for illustrating assembly of the light source unit to the image-reading apparatus. FIG. 9 is a perspective view illustrating a state in which each component illustrated in FIG. 8 is assembled to the frame. FIG. 10 is a perspective view illustrating a fitting portion of a cutout portion of the light source unit and a rib of a frame in a state in which the light source unit is assembled to the frame.

As illustrated in FIGS. 5 and 6, in addition to the plurality of LEDs 23, a connector 25 is provided at one end of the main-scanning direction, and a cutout portion 26 is provided at the other end in the LED array substrate 21 of the light source units 9 and 15. The connector 25 supplies a power to the LED array substrate 21. In addition, the connector 25 is disposed so as to be capable of being brought into contact with an end face of the LED diffusion case 22 when the LED array substrate 21 is inserted into the LED diffusion case 22. That is, when the LED array substrate 21 is inserted into the LED diffusion case 22 until the end face of the LED diffusion case 22 contacts the connector 25, a shift of the LED diffusion case 22 relative to the LED array substrate 21 toward the connector 25 in the main-scanning direction can be restricted. This facilitates alignment of the LED 23 on the LED array substrate 21 with the suppression pattern 24 on the LED diffusion case 22.

The size of the LED diffusion case 22 in the main-scanning direction is equal to or shorter than a distance between the connector 25 and the cutout portion 26. Therefore, the cutout portion 26 is provided at a position where the cutout portion 26 is exposed from the LED diffusion case 22 when the LED array substrate 21 is inserted into the LED diffusion case 22. The cutout portion 26 is configured so that the LED array substrate 21 is fixed to a frame 100c of the image-reading apparatus 100 to improve the smooth assembly when the light source units 9 and 15 are assembled to the image-reading apparatus 100.

As illustrated in FIGS. 8 and 10, a protruding rib 100d is provided in the frame 100c of the image-reading apparatus 100 (rotating unit 100b) at a position opposite to the cutout portion 26 when the light source unit 9 of the first image-reading unit 4 is assembled. Since the position at which the light source unit 9 is assembled to the image-reading apparatus 100 can be easily determined by fitting the cutout portion 26 of the light source unit 9 with the rib 100d of the frame 100c, facility in assembling the light source unit 9 to the image-reading apparatus 100 can be improved. Moreover, a shift of the light source unit 9 relative to the image-reading apparatus 100 in the main-scanning direction can be restricted by fitting the cutout portion 26 with the rib 100d.

As illustrated in FIGS. 8 and 9, the image-reading apparatus 100 further includes a sheet-metal heat sink 13 and a fixing member 14. The sheet-metal heat sink 13 is a metallic material for dissipating heat generated by light emission of the light source unit 9, and is disposed in intimate contact with a periphery except at least the diffusion unit 22a along a longitudinal direction of the LED diffusion case 22 (refer to FIG. 2). The fixing member 14 is a member for fixing the light source unit 9 to the frame 100c of the image-reading apparatus 100 (rotating unit 100b). The fixing member 14 is configured so as to be lockable to the frame 100c with an approach, such as, for example, a snap-fit without using separate fixing parts such as a screw.

As illustrated in FIG. 8, when the light source unit 9 is assembled to the frame 100c, first, in a state in which the LED array substrate 21 is inserted into the LED diffusion case 22 until the end face of the LED diffusion case 22 contacts the connector 25, the cutout portion 26 of the LED array substrate 21 is fitted with the rib 100d of the frame 100c to mount the light source unit 9 in the frame 100c. Next, the sheet-metal heat sink 13 is mounted so as to cover the periphery of the light source unit 9. Then, the fixing member 14 is fixed to the frame 100c so as to cover the sheet-metal heat sink 13.

In this way, in the present embodiment, the light source unit 9 can be assembled to the image-reading apparatus 100 without using fixing parts such as a screw, which improves the ease of assembly. In addition, the LED diffusion case 22 of the light source unit 9 is disposed between the rib 100d provided in the frame 100c and the connector 25 of the LED array substrate 21. Even when the precision of the positions of the connector 25 and the cutout portion 26 of the LED array substrate 21, and the precision of the length of the LED diffusion case 22 in the main-scanning direction are taken into consideration, assembly with a precision within the allowable range A of the deviation of the center of the pattern 24 is sufficiently possible, and the ripple suppression effect can be sufficiently exerted.

In addition, the light source unit 15 of the second image-reading unit 5 is also assembled to the image-reading apparatus 100 in a configuration similar to that of the light source unit 9 of the first image-reading unit 4. That is, the cutout portion 26 of the light source unit 15 is fitted with the rib provided in an enclosure of the body unit 100a of the image-reading apparatus 100 such that the light source unit 15 can be assembled to the image-reading apparatus 100 with a sheet-metal heat sink 19 (refer to FIG. 2) or a fixing member which is not illustrated.

In this way, the light source units 9 and 15 of the present embodiment each include the LED array substrate 21 on which the plurality of LEDs 23 which emit light toward the medium whose image is read by the image sensors 12 and 18 are arranged in the main-scanning direction, and the diffusion unit 22a which transmits the light emitted from the LED 23 and diffuses the light therein. The pattern 24 which suppresses emission of light to the outside is formed at a position opposite to each of the plurality of LEDs 23 in the diffusion unit 22a.

This configuration allows suppression of the illuminance unevenness of the emitted light because the pattern 24 can decrease the transmission quantity of the emitted light and suppress emission of the emitted light partially at a position where the illuminance of the light emitted from the diffusion unit 22a onto the medium is larger. As a result, in the configuration in which the plurality of light-emitting elements (LEDs 23) are arranged in a straight line, generation of the ripple can be suppressed in a linear light emitted onto the medium to be lighted.

Figure 11:
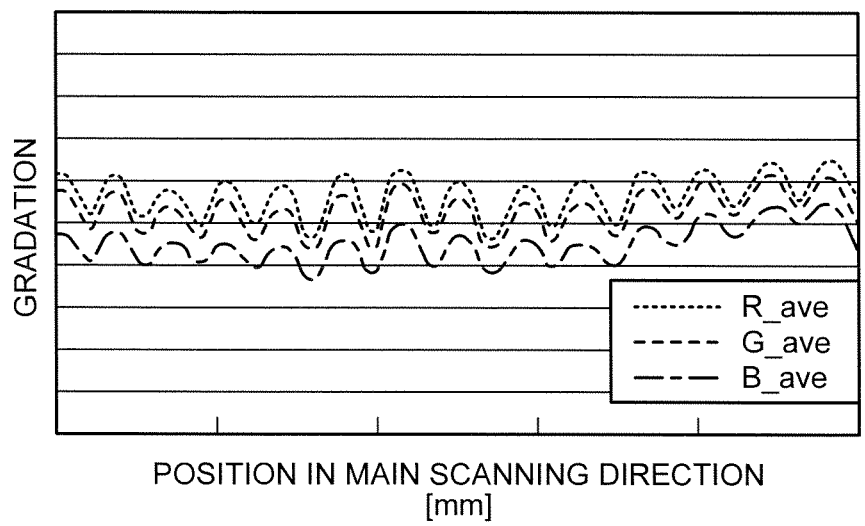
FIG. 11 is a diagram illustrating RGB gradation of medium image data generated in a medium-reading device without a pattern in a diffusion unit as a comparative example.
Figure 12:
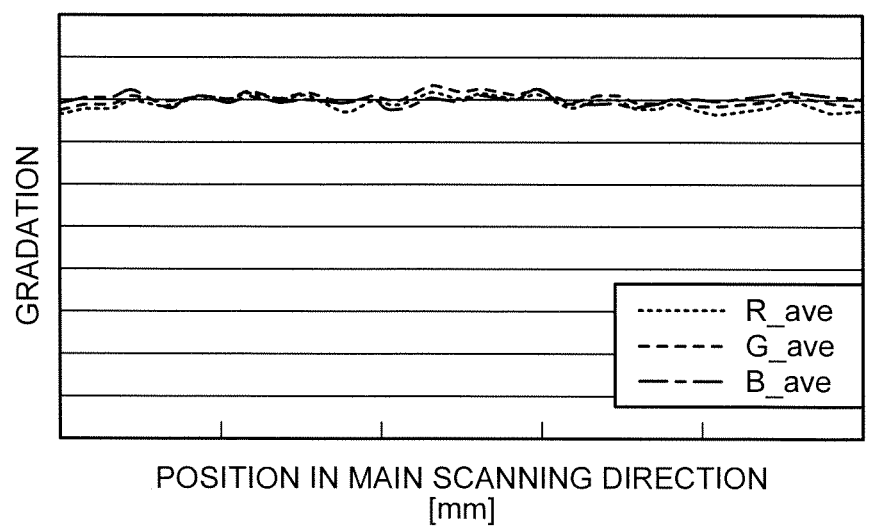
FIG. 12 is a diagram illustrating RGB gradation of medium image data generated in a medium-reading device with a pattern in a diffusion unit according to the present embodiment.

The effect of the present embodiment will be further described with reference to FIGS. 11 and 12. FIG. 11 is a diagram illustrating RGB gradation of medium image data generated in a medium-reading apparatus having a diffusion unit 22a without the pattern 24 as a comparative example. FIG. 12 is a diagram illustrating RGB gradation of medium image data generated in a medium-reading apparatus of the present embodiment which has the pattern 24 in the diffusion unit 22a. In FIGS. 11 and 12, a horizontal axis indicates a position (mm) of the image data in the main-scanning direction, and a vertical axis indicates gradation. In addition, in FIGS. 11 and 12, a fine dotted line illustrates transition of a red gradation value (R_ave), a rough dotted line illustrates transition of a green gradation value (G_ave), and a dashed dotted line illustrates transition of a blue gradation value (B_ave) at each position.

As illustrated in FIG. 11, the comparative example without the pattern 24 in the diffusion unit 22a illustrates that the RGB gradation varies periodically along the main-scanning direction, and that a ripple is generated in the light emitted onto the medium. In contrast, as illustrated in FIG. 12, the configuration of the present embodiment with the pattern 24 in the diffusion unit 22a illustrates that the periodic variation of the RGB gradation found in the comparative example is decreased, and that the ripple is suppressed. That is, according to FIGS. 11 and 12, generation of the ripple is confirmed to be suppressed in the light emitted onto the medium as in the light source units 9 and 15 of the present embodiment by formation of the pattern 24 in the diffusion unit 22a of the LED diffusion case 22.

[Variation]

Figure 13:
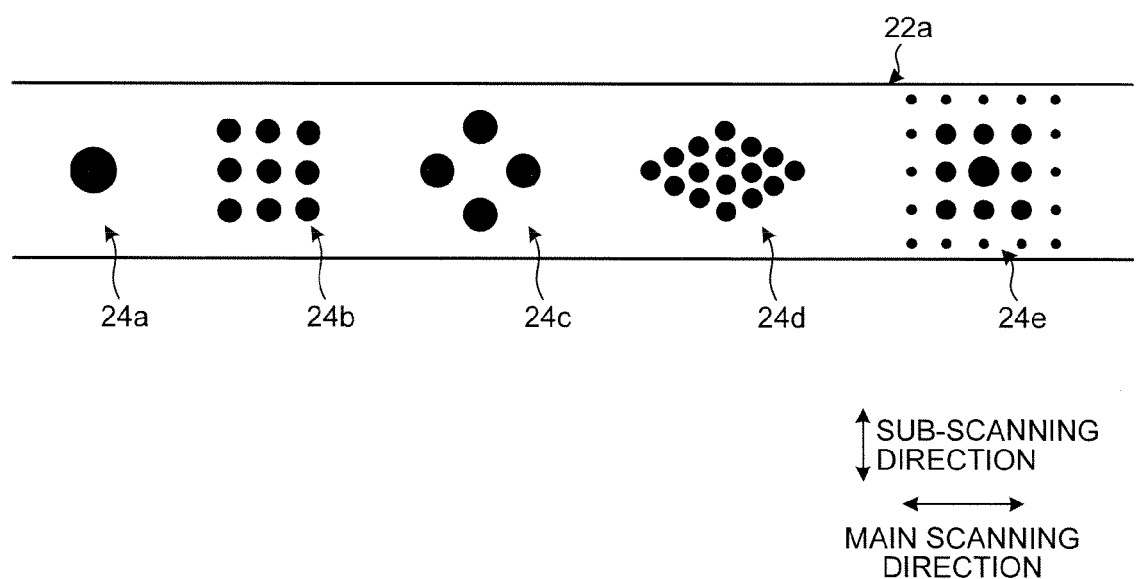
FIG. 13 is a schematic view illustrating a variation of a pattern shape printed on the diffusion unit of the LED diffusion case.

Next, a variation of the embodiment will be described with reference to FIG. 13. FIG. 13 is a schematic view illustrating a variation of a shape of a pattern printed in a diffusion unit of an LED diffusion case. As illustrated in FIG. 13, a shape of the pattern printed in a diffusion unit 22a of an LED diffusion case 22 may be a shape different from the rhombus-shaped pattern 24 of the above-described embodiment.

For example, the pattern may be configured so that one dot is disposed right above an optical axis of an LED 23 as shown in a pattern 24a illustrated in FIG. 13. The pattern may be configured so that halftone dots are disposed in a square shape with a central position of the square coinciding with a position of the optical axis as shown in a pattern 24b. That is, what is necessary is only to satisfy a condition that a central position of the pattern shape is disposed so as to coincide with a position through which the optical axis of each LED 23 passes.

In addition, as shown in the pattern 24c illustrated in FIG. 13, the pattern may be configured so that the pattern has a rhombus shape similar to that of the pattern 24 of the embodiment, an area of each dot of the halftone dots is made larger, and the number of the dots disposed in the pattern is decreased, as compared with the pattern 24, or as shown in the pattern 24d, the pattern may be configured so that the area of each dot of the halftone dots is made smaller, and the number of the dots disposed in the pattern is increased. In this case, density of the halftone dots in the pattern may be made identical to that of the pattern 24 of the embodiment.

Moreover, as shown in the pattern 24e illustrated in FIG. 13, the pattern may be configured so that the halftone dots are disposed in a square shape, a size of each dot of the halftone dots is largest at the central position of the pattern shape and is incrementally smaller with distance from the central position in the main-scanning direction and the sub-scanning direction.

The embodiment of the present invention has been described above, but the above-described embodiment is presented by way of example and is not intended to limit the scope of the invention. The above-described embodiment can be implemented in various other forms, and various exclusions, replacements, and changes may be made without departing from the spirit of the invention. The above-described embodiment and variation are included within the spirit and scope of the invention, and within the scope of the invention designated in the appended claims and equivalents thereof.

The above-described embodiment illustrates the configuration in which the pattern 24 is printed on the medium side of the outer surface of the diffusion unit 22a of the LED diffusion case 22, but may have a configuration in which the pattern 24 is printed on the side of the LED array substrate 21 of the inner surface of the diffusion unit 22a. Moreover, the pattern 24 may be formed in the diffusion unit 22a of the LED diffusion case 22 by approaches other than printing.

Furthermore, the above-described embodiment illustrates that the shape of the pattern 24 is formed so that the degree of suppression of light emission from the diffusion unit 22a to the outside decreases both in the main-scanning direction and the sub-scanning direction, but may have a configuration in which the degree of suppression decreases only in the main-scanning direction.

The above-described embodiment illustrates the configuration in which the light source units 9 and 15 are LED array lighting having the plurality of LEDs 23, but the light source units 9 and 15 only need to have a plurality of light-emitting elements which can emit light linearly onto the medium, and may use a light-emitting element other than an LED.

The above-described embodiment mentions the scanner device as an example of the image-reading apparatus 100, and more particularly, the automatic paper-feeding scanner which causes a relative shift of the image sensor and the medium by shifting the medium to be read relative to the image sensor, but the scanner device may have another configurations, for example, a flatbed scanner which shifts an image sensor relative to a medium.

The above-described embodiment illustrates the scanner device as an example of the image-reading apparatus 100, but the image-reading apparatus only need to be a device which reads a medium to be read and generates image data, or a device which can print on another medium, and can include devices such as a copying machine, a facsimile machine, and a character recognition device other than the scanner device.

According to the present invention, since outward emission of light can be partially suppressed with a pattern at a position in a vicinity of an optical axis of a light-emitting element where illuminance of the light emitted onto a medium is higher, generation of a ripple can be suppressed in the linear light emitted onto the medium to be lighted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-reading apparatus comprising:
a light source unit that includes,
a light source section on which a plurality of light-emitting elements that emit light toward a medium whose image is read by an image-capturing unit are arranged in a main-scanning direction, and
a diffusion unit that transmits and diffuses therein the light emitted from the light-emitting elements,
wherein a pattern for suppressing light emission to an outside is formed at a position opposite to each of the plurality of light-emitting elements in the diffusion unit;
a rib provided in a frame of the image-reading apparatus, the rib being capable of being fitted with a cutout portion when the light source unit is assembled; and
a fixing member for fixing the light source unit to the frame with the cutout portion being fitted with the rib and the light source unit being mounted on the frame, wherein
the light source section of the light source unit includes a connector provided at one end of the main-scanning direction and the cutout portion provided at the other end of the main-scanning direction,
the diffusion unit of the light source unit has a shape through which the light source section is inserted,
a size of the diffusion unit in the main-scanning direction is equal to or shorter than a distance between the connector and the cutout portion.

2. The image-reading apparatus according to claim 1, wherein, in the light source unit, the pattern is formed so that the degree of suppression decreases with distance from the position through which the optical axis passes in an sub-scanning direction.

3. The image-reading apparatus according to claim 2, wherein, in the light source unit, the pattern is a dot pattern that includes diagonal lines along the main-scanning direction and the sub-scanning direction, the dot pattern being disposed inside a rhombus with a point of intersection of the diagonal lines being the position through which the optical axis passes.

4. The image-reading apparatus according to claim 1, wherein, in the light source unit, the pattern is formed at a position through which an optical axis of each of the light-emitting elements passes.

5. The image-reading apparatus according to claim 4, wherein, in the light source unit, the pattern is formed so that the degree of suppression decreases with distance from the position through which the optical axis passes in the main-scanning direction.

* * * * *